July 5, 1966  A. POIRIER  3,258,969
DIFFERENTIAL TEMPERATURE MEASURING APPARATUS
Filed Dec. 12, 1963  3 Sheets-Sheet 1
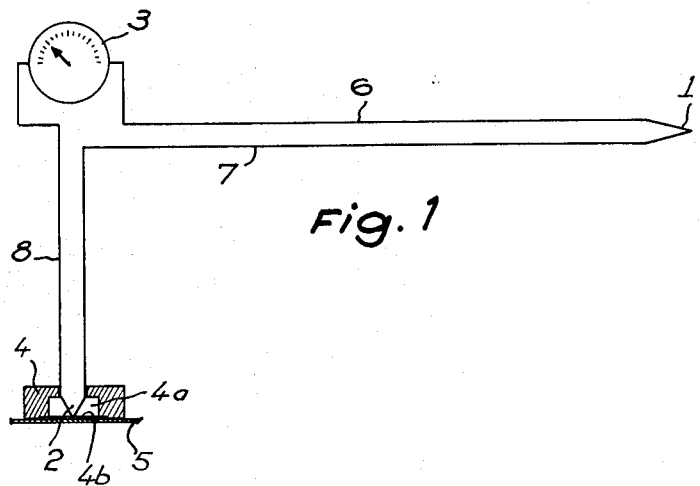
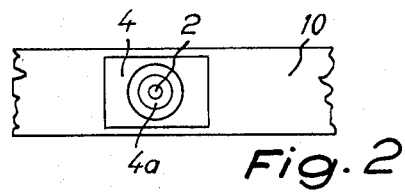
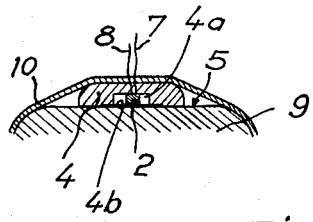
ALBERT POIRIER
BY
FLYNN, MARN & JANGARATHIS

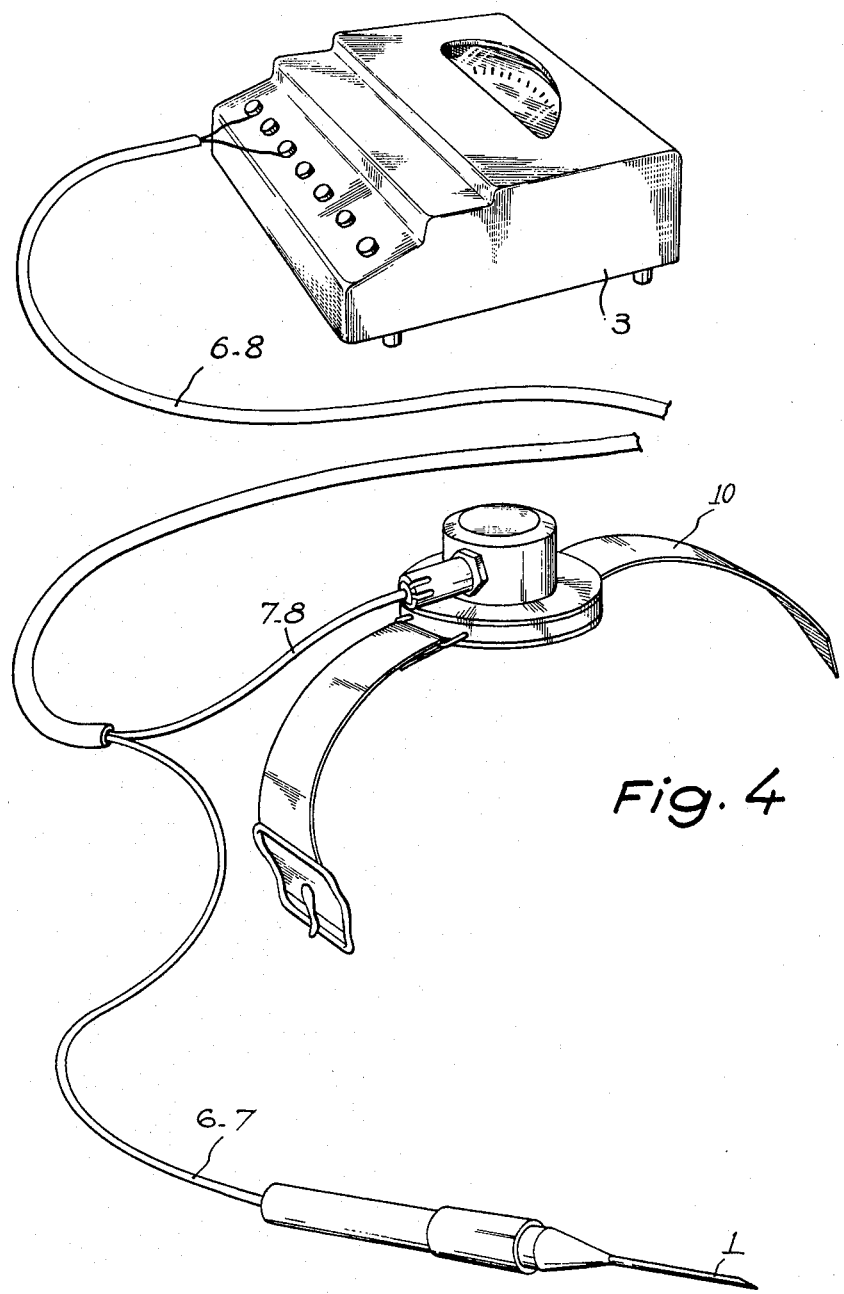

United States Patent Office 3,258,969
Patented July 5, 1966

3,258,969
DIFFERENTIAL TEMPERATURE MEASURING
APPARATUS
Albert Poirier, Paris, France, assignor to Societe Anonyme: C. Jacobsen & Cie, Paris, France, a French company
Filed Dec. 12, 1963, Ser. No. 330,056
Claims priority, application France, Dec. 14, 1962, 918,595, Patent 1,350,122
4 Claims. (Cl. 73—361)

This invention relates to methods of temperature measurement using a pair of thermocouples connected in series opposition with a galvanometer, and wherein one thermocouple is exposed to a temperature that is to be measured while the other thermocouple is subjected to a predetermined reference temperature. The deflection of the galvanometer pointer can then be made to be a measure of the difference of the measured temperature over the reference temperature.

Differential temperature measurement methods of this kind are extremely convenient and are widely used both in the laboratory and in the workshop in connection with various manufacturing processes. When applied in the laboratory a container of melting ice is generally used as a stable source of reference temperature at 0° C. In a production plant it is not usually feasible to use a similar source of reference temperature since it would be cumbersome to carry about from place to place and would, moreover, require excessively frequent replenishment in view of the relatively high ambient temperature generally prevailing in the plant. For this reason it has been customary to use ambient atmospheric temperature as the source of reference temperature. Clearly this is not very satisfactory since inevitable variations in the air temperature will result in corresponding errors in the temperature measurement. Usually therefore, it has been necessary to supplement the differential measurement with an absolute measurement of the ambient atmospheric temperature at the time of operation, and then apply a corrective factor to the differential temperature reading as given by a table or chart specially drawn up for the purpose.

Objects of this invention are to provide a method and apparatus of differential temperature measurement whereby such measurements can be carried out quickly and conveniently under any practical circumstances without requiring a bulky separate source of reference temperature and yet with a degree of accuracy amply sufficient for most engineering purposes so as to dispense with the need for an absolute temperature measurement or the use of correcting factors.

It is a specific object to provide differential temperature measuring apparatus wherein the source of reference temperature is the temperature of the human body. Preferably this reference temperature is picked off the skin of the operator's wrist. Accordingly in a preferred form of the invention there is provided a housing contianing a reference thermocouple within it, a wrist-strap or the like mounting the housing, the arrangement being such that when the wrist-strap is fixed about the operator's wrist said reference thermocouple will be in close thermally conductive contact with a surface area of the skin of the wrist, and circuit conductors connecting the reference thermocouple with a measuring thermocouple and with a galvanometer or similar indicator instrument.

In one desirable form of the invention, the indicating instrument is mounted directly on the wrist-strap to be conveniently viewed by the operator during the measurement in the fashion of a wrist-watch.

Exemplary embodiments of the invention will now be described for purposes of illustration but not of limitation with reference to the accompanying drawings wherein:

FIGURE 1 is a schematic view of differential temperature measuring apparatus according to the invention;

FIGURE 2 is a partial view of the wrist-strap and reference thermocouple housing from below;

FIGURE 3 is a sectional view of the wrist-strap and reference thermocouple housing in place on an operator's wrist, the section being on a plane normal to the longitudinal direction of the forearm;

FIGURE 4 is a general perspective view of one practical embodiment; and,

Figure 5:
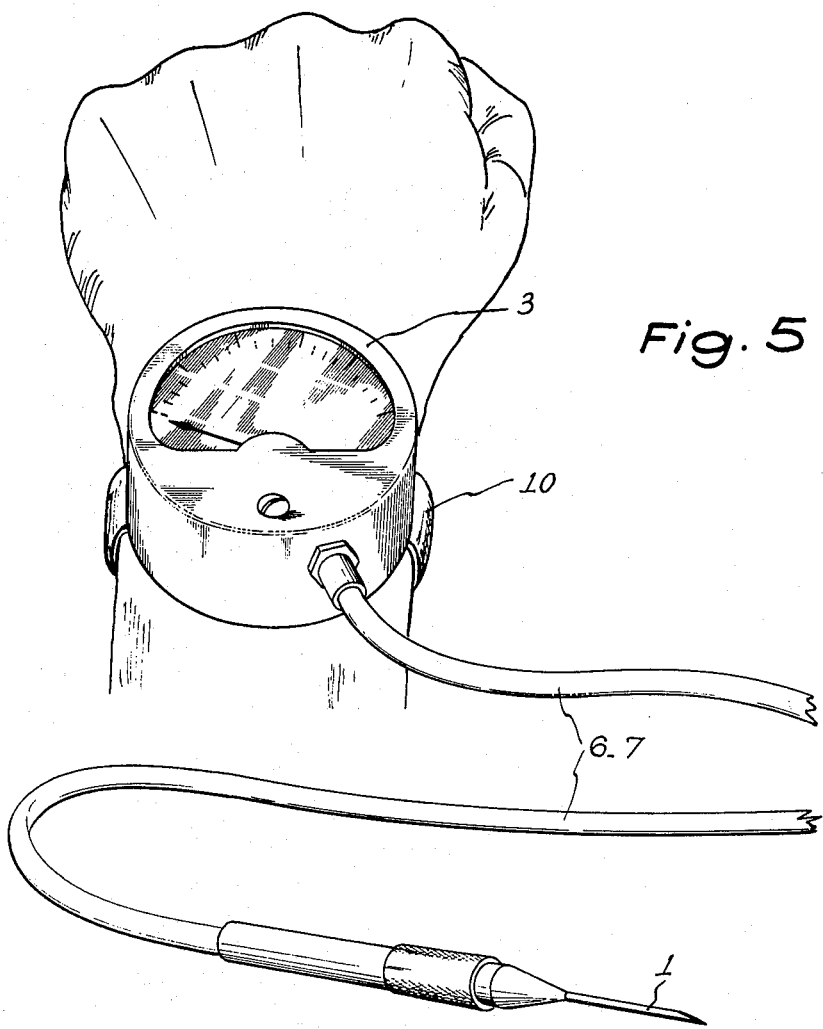
FIGURE 5 is a similar view of another practical embodiment.

The apparatus shown in FIGURE 1 comprises a first, or measuring, thermocouple 1, a second, reference, thermocouple 2, and a galvanometer-type indicating instrument 3. Thermocouple 1 has one terminal connected by lead 6 to a terminal of the galvanometer and its other terminal connected by leads 7 and 8 with one terminal of thermocouple 2. The remaining terminal of thermocouple 2 is connected by a lead 8 to the free terminal of galvanometer 3.

There is thus provided a conventional differential temperature measuring setup. In operation, as is well-known, a potential difference is developed across the terminals of each of the thermocouples which is a function of the temperature to which the thermocouple is exposed. The connections are such that the two potential differences are applied in opposing relation to the terminals of the galvanometer 1. Hence the deflection of the galvanometer pointer is a measure of the difference between them and consequently a measure of the temperature difference between the thermocouples.

In order that the galvanometer reading shall be a measure of the temperature to which the measuring thermocouple 1 is exposed, it is essential that the reference thermocouple 2 should be exposed to some well-defined standard temperature source. Heretofore no practical standard source of this kind has been available for all-round field use as in a production plant, and hence it has been customary to expose the reference thermocouple 2 to the surrounding air as the reference temperature source for want of a better one. This has seriously impaired the accuracy of the temperature measurements obtainable, as can be seen from the following simple example.

Assume the temperature T to be measured and to which thermocouple 1 is exposed, in 100° C. If the nominal reference temperature for which the instrument is calibrated is 20° C., and the thermocouples are so selected that the differential E.M.F. developed for the temperature difference $T-t=80°$ C. is 4 millivolts, then the galvanometer dial should be calibrated to indicate 20° C. for zero E.M.F. and 100° C. for an E.M.F. of 4 mv. applied across its terminals. Now assuming the ambient temperature at the time of measurement is 25° C. instead of 20° C., a common occurrence, the instrument would indicate only 20° C. if the measuring thermocouple 1 is exposed to a temperature of 25° C., and would only indicate 55° C. when the measured temperature is $T=100°$ C. Such errors are unacceptably large and require relatively complicated correcting procedures as earlier indicated.

In accordance with this invention a relatively stable reference temperature is provided for thermocouple 2 in the form of the skin temperature of the operator's body, preferably picked off the wrist. Referring to FIGURES 1-3, the reference thermocouple 2 is mounted within a recess 4a provided within a casing 4, made of suitable material having low thermal conductivity. The base of recess 4a is sealed by a metallic diaphragm 4b, and the thermocouple 2 is suitably supported so as to lie in firm engagement with the upper surface of diaphragm 4b. The under side of this diaphragm is shown as lying in engagement with the surface 5 of the operator's skin. As shown in FIGURES 2 and 3, the housing 4 is seen to be attached through any suitable means to the under surface of a wrist-strap 10 which surrounds the operator's wrist partly visible at 9. Conventional means such as a buckle and tongue (see FIGURE 4), are provided to clasp the wrist-strap about the wrist and thus draw the diaphragm 4b and thermocouple 2 thereon into close thermal contact with the upper area of the wrist.

FIGURE 4 illustrates one practical arrangement of the main parts just referred to, and here designated with the same references as in FIGURES 1–3. It will be noted that the galvanometer indicating instrument 3 is here provided separately for location on a desk or the like.

In the alternative embodiment of FIGURE 5 the galvanometer 3 is shown unitary with the casing 3 so that its dial and pointer are readily visible to the operator carrying the instrument on his wrist.

The operation of the instrument will be immediately apparent from the explanations previously given. After the operator has been wearing the wrist-strap for a short time so that the reference thermocouple is in thermal equilibrium with the skin temperature of his wrist, the galvanometer 3 will quickly and accurately give a reading of any temperature to which the measuring thermocouple 1 may be exposed.

The invention is made possible by, and takes advantage of, the well-known biological phenomenon of body temperature regulation whereby any individual in normal health maintains a body temperature that remains constant to within remarkably close limits regardless of external temperature variations. Of course body temperature variations do occur even in conditions of normal health but such variations are slight, usually under ±0.5° C., so that the resulting errors in the measurement can be disregarded for most practical purposes. On the other hand, in case of an abnormal rise in temperature due to a feverish condition, it should be noted that when such abnormal temperature increase attains as little as 2° C., it is inevitably accompanied by other symptoms and disorders so that it cannot escape unnoticed and the unwell operator will then naturally hand the instrument over to some other member of the staff. Thus the invention is assured of a high degree of reliability and accuracy in the temperature measurements at the same time as it provides an extremely handy and practical instrument for field use.

What I claim is:

1. Differential temperature measuring apparatus in combination a casing, a thermocouple contained in the casing, wrist-strap means attached to the casing for strapping same to an operator's wrist with said thermocouple in close heat-exchange relation with an area of the skin of the wrist, another thermocouple, an electrical indicating instrument, and conductor means extending from said casing and connecting both thermocouples in a differential circuit with said instrument whereby the instrument will indicate temperatures to which the second thermocouple is exposed.

2. Apparatus as claimed in claim 1 wherein said casing is made of a material having low heat conductivity.

3. Apparatus as claimed in claim 1 wherein said casing is sealed on an inner side thereof by means of a metallic plate having a surface within the casing contacted by said first thermocouple and having an exterior surface engageable with the skin of the operator's wrist.

4. Differential temperature measuring apparatus comprising in combination a casing, a reference thermocouple in the casing, a galvanometer-type indicating instrument supported from the casing and having a dial readable from an upper side thereof, wrist-strap means attached to the casing for strapping same to an operator's wrist with said reference thermocouple in close heat conductive relation with an area on the operator's skin, a measuring thermocouple, and conductor means extending from said casing and connecting the reference and measuring thermocouples in a differential electric circuit with said instrument.

References Cited by the Examiner
UNITED STATES PATENTS 2,012,112    8/1935    States _____ 73—359 X
2,016,894    10/1935    Faus _____ 73—361

FOREIGN PATENTS 474,761    4/1929    Germany.

LOUIS R. PRINCE, *Primary Examiner.*

DAVID SCHONBERG, *Examiner.*

D. McGIEHAN, *Assistant Examiner.*